(12) United States Patent
Silverman et al.

(10) Patent No.: US 8,541,541 B2
(45) Date of Patent: Sep. 24, 2013

(54) CONDUCTIVE BLOCK COPOLYMERS

(75) Inventors: Gary S. Silverman, Chadds Ford, PA (US); Thomas P. McAndrew, Limerick, PA (US); Scott C. Schmidt, West Chester, PA (US); David A. Mountz, Exton, PA (US); Mark A. Aubart, Malvern, PA (US); Nicholas J. Rodak, Princeton, NJ (US)

(73) Assignee: Arkema Inc., King of Prussia, PA (US)

( * ) Notice: Subject to any disclaimer, the term of this patent is extended or adjusted under 35 U.S.C. 154(b) by 635 days.

(21) Appl. No.: 11/815,038

(22) PCT Filed: Mar. 3, 2006

(86) PCT No.: PCT/US2006/007701
§ 371 (c)(1),
(2), (4) Date: Jul. 30, 2007

(87) PCT Pub. No.: WO2006/096550
PCT Pub. Date: Sep. 14, 2006

(65) Prior Publication Data
US 2008/0169451 A1 Jul. 17, 2008

Related U.S. Application Data

(60) Provisional application No. 60/659,278, filed on Mar. 7, 2005.

(51) Int. Cl.
*C08G 75/00* (2006.01)
(52) U.S. Cl.
USPC ........... 528/378; 528/373; 528/377; 528/380; 252/500
(58) Field of Classification Search
USPC .................. 252/500; 528/373, 377, 378, 380
See application file for complete search history.

(56) References Cited

U.S. PATENT DOCUMENTS

| | | | | |
|---|---|---|---|---|
| 5,726,268 | A * | 3/1998 | Sakamoto | 526/329.7 |
| 5,885,711 | A * | 3/1999 | Clarisse et al. | 428/407 |
| 6,166,172 | A * | 12/2000 | McCullough et al. | 528/380 |
| 6,569,967 | B1 | 5/2003 | Couturier et al. | |
| 6,602,974 | B1 * | 8/2003 | McCullough et al. | 528/73 |
| 6,657,041 | B1 | 12/2003 | Machida et al. | |
| 7,279,534 | B2 * | 10/2007 | Luebben et al. | 525/410 |
| 7,294,288 | B2 * | 11/2007 | Koller et al. | 252/500 |
| 2006/0278867 | A1 * | 12/2006 | McCullough et al. | 257/40 |
| 2007/0278453 | A1 * | 12/2007 | Zahn et al. | 252/500 |

OTHER PUBLICATIONS

Graft copolymers of poly (methyl methacrylate) and polythiophene, Hallensleben et al., Macromol. Chem. Phys. 196, pp. 3535-3547, 1995.*

Blcok-copolymers with conjugated segments: Synthesis and structural characterization, Francois et al, Synthetic metals 69, 1995, pp. 463-466.*

Youngmin, L.,"A High Purity Approach to Poly (3-hexylthiophene) Diblock Copolymers", Journal of Polymer Science: Part A:Polymer Chemistry, vol. 46, p. 8200-8205 (2008).

Evanoff, D., Jr."Poly(methyl methacrylate) Copolymers Containing Pendant Carbazole and Oxadiazole Moieties for Applications in Single-Layer Organic Light Emitting Devices", Journal of Polymer Science: Part A:Polymer Chemistry, vol. 46, p. 7882-7897 (2008).

* cited by examiner

*Primary Examiner* — Mark Kopec
*Assistant Examiner* — Haidung Nguyen
(74) *Attorney, Agent, or Firm* — Thomas F. Roland

(57) ABSTRACT

The invention relates to the synthesis of polythiophene (PAT) copolymers, and their use as conductive polymers in final applications. Specifically, copolymers of PAT with (meth) acrylates, or amides are useful as additives in blends of different polymer matrices in many commercial applications.

8 Claims, No Drawings

CONDUCTIVE BLOCK COPOLYMERS

This application claims benefit, under U.S.C. §119 or §365 of PCT/US2006/07701 filed Mar. 3, 2006; and U.S. 60/659,278, filed Mar. 7, 2005.

FIELD OF THE INVENTION

The invention relates to the synthesis of polythiophene (PAT) copolymers, and their use as conductive polymers in final applications. Specifically, copolymers of PAT with (meth)acrylates, or amides are useful as additives in blends of different polymer matrices in many commercial applications.

BACKGROUND OF THE INVENTION

Electrically conductive polymers (ECP's) are polymers that display many or all the properties of a metal, but have no metal atoms, or display said metallic properties through a non-classical mechanism. Typically, the property of greatest interest is high electrical conductivity, although electrically conductive polymers display other metallic properties—magnetic, optical, and thermoelectric.

Few practical applications for ECP's have entered the market, although many have been considered. Obstacles for the use of these materials include instability of electrical conductivity over time, relatively high cost, and competition from carbon compounds like graphite, which have very high, and stable, electrical conductivities. Unfortunately, with carbon, the loading is high (10-40 wt %) and there is only one choice of color, black—rendering low to no transparency.

In a recent report, a series of commercially available conductive polythiophene polymers (PATs) have been prepared with ostensibly stable conductivity. Making block copolymers of these polymers induces high conductivity when blended with traditional polymers at a low additive level. In addition to conductivity, the advantages are that these polymers are colorless with high transparency, a significant advantage relative to carbon (black) or polyaniline (dark green). More interestingly, some of these polymers can undergo self-assembly inducing a phase separation event resulting in high connectivity. This produces high electrical conductivity at low concentrations, minimizing cost without compromising the otherwise desirable properties of the host polymer system; e.g., color, transparency and mechanical properties.

To have good compatibility with polymethylmethacrylate (pMMA), polyamides, and polyvinylidene fluoride or other fluoropolymers, a polymethacrylate block is necessary to compatibilize the conductive PATs with the polymer matrix. Unfortunately, methacrylates cannot be copolymerized with the modified PATs by conventional technology, i.e. chain termination is fast due to H-atom abstraction from the 2-methyl group of the methacrylate.

A method to solve the problem of methacrylate copolymerization has recently been overcome in other systems using controlled free radical polymerization technology.

This invention describes the synthesis and use of novel conductive copolymers that can be used as polymer additives to impart conductivity. Block copolymers of a conductive polymer such as polythiophenes, polyanilines, polyphenylenes combined with pMMA, fluoropolymers, or polyamides have potential utility in many applications

SUMMARY OF THE INVENTION

An electroconductive copolymer composition is presented comprising repeating segments of A and B and optionally C, in which A is selected from substituted or unsubstituted polythiophene, polyaniline or polypyrrol, B comprises a methacrylic polymer, copolymer or terpolymer or one or more amides, and C is selected from ethylenically unsaturated copolymerizable monomers other than methylmethacrylate.

A method of manufacturing the electroconductive copolymer above is presented in which controlled radical polymerization initiators and/or coupling of functionalized copolymers is used. In a preferred the controlled radical polymerization initiator is an alkoxyamine.

An electroconductive polymer composition comprising:
a) from 0.01 to 70 percent by weight of said electroconductive copolymer of claim 1; and
b) from 99.99 to 30 percent by weight of one or more polymers miscible with said electroconductive copolymer.

The article comprising an electroconductive polymer is presented for use in, but not limited to, an organic light emitting diode, a touch panel display, an electrostatic charge dissipation coating, and electromagnetic interference shielding coating, and electrical discharge underlayer for use in electron beam imaging, a conductive support for a substrate exposed to electron beam imaging, an acrylic display window, an electrostatic dissipating PA-11 or PA-12, an electroconductive PVDF, a substrate for receiving electrostatic painting or electroplating, or a fiber or filament.

DETAILED DESCRIPTION OF THE INVENTION

Several methods may be used in forming copolymers with PATs. By "copolymers" is meant polymers having two or more different monomers, and is meant to include terpolymers and other multi-monomer polymers. Copolymers most useful for applications of the present invention are those having a controlled architecture, including block, star, comb, and graft copolymers. The copolymers of the invention include, but are not limited to, the specific examples that follow. By "PAT" or "polythiophenes" as used herein is meant not only poly(3-alkylthiophenes) but also any substituted or unsubstituted polythiophene. This includes regioregular poly (alkylthiophene) and also other polymers and copolymers.

The electroconductive copolymer of the invention is composed of repeating segments A, B and optionally one or more C. A is the electroconductive segment and is selected from substituted or unsubstituted polythiophene, polyaniline or polypyrrol. B is either a methacrylic polymer, copolymer or terpolymer or one or more amides.

The methacrylic polymer includes polymers (used herein to include homo-polymers, co-polymers, and polymers formed from three of more monomers such as terpolymer) formed primarily from alkyl methacrylate and alkyl acrylate monomers, and mixtures thereof. The alkyl methacrylate monomer is preferably methyl methacrylate, which may make up from 60 to 100 weight percent of the monomer mixture. 0 to 40 weight percent of other acrylate and methacrylate monomers may also be present in the monomer mixture. Other methacrylate and acrylate monomers useful in the monomer mixture include, but are not limited to methyl acrylate, ethyl acrylate and ethyl methacrylate, butyl acrylate and butyl methacrylate, iso-octyl methacrylate and acrylate, lauryl acrylate and lauryl methacrylate, stearyl acrylate and stearyl methacrylate, isobornyl acrylate and methacrylate, methoxy ethyl acrylate and methacrylate, 2-ethoxy ethyl acrylate and methacrylate, dimethylamino ethyl acrylate, fluorinated acrylates and methacrylates, and methacrylate monomers. Alkyl (meth) acrylic acids such as methyl acrylic acid and acrylic acid can be useful for the monomer mixture.

Small levels of multifunctional monomers as crosslinking agents may also be used. Suitable crosslinking monomers include but are not limited to, for example, allyl methacrylate, allyl acrylate, divinylbenzene, ethylene glycol dimethacrylate and diacrylate, ethylene glycol triacrylate and trimethacrylate, butylene glycol dimethacrylate, glycidyl methacrylate, triallyl isocyanurate, N-hydroxymethyl acrylamide, N,N-methylene diacrylamide and dimethylacrylamide, triallyl citrate, trimethylolpropalne triacylate, trimethylolpropane trimethacrylate, diethyleneglycol divinyl ether, and the like. Styrenic monomers such as styrene and alpha-methyl styrene could also be incorporated into the polymer in small amounts of 0-5 weight percent.

Segment C is selected from ethylenically unsaturated copolymerizable monomers other than methylmethacrylate. Block Copolymers of Acrylic Polymers (i.e., pMMA) and Polythiophenes, and Graft Polymers Comprising Acrylic Polymers (i.e., pMMA) with Pendant Polythiophenes Both of these types of copolymers will have general utility for any application where polythiophene polymers are useful. With conductive polymers a general issue is that performance and processability must coexist. For polythiophene polymers, this means that 3-substitutions and dopants that are desirable from a performance standpoint may not be desirable from a processability standpoint, and vice-versa. The use of the above block and graft copolymers enables decoupling of performance and processability—a very desirable situation.

With the use of either type of copolymer, the polythiophene configuration can be chosen for desired performance. The pMMA phase will provide for easy solution processing. Another way of regarding these systems is polythiophene polymers with enhanced processability. A specific benefit of pMMA, vis-à-vis other copolymers considered (such as polystyrene and polyurethanes) is its combination of: optical clarity, low cost, mechanical strength/durability. These will all enhance, rather than detract from, the performance of the polythiophene polymer. For example, copolymers with polystyrene and polyurethane would be unsuited to the major application of organic light emitting diodes. In contrast, pMMA is ideally suited.

As for performance, it has been demonstrated that block copolymers of poly(3-alkyl substituted thiophenes) with either polystyrene or polyurethane perform very well from the polythiophene standpoint (i.e., electrical properties). Said block copolymer systems also display the self-assembly characteristics of pure poly(3-alkyl substituted thiophene) polymers. However, pMMA-PAT block copolymers were never synthesized and tested previously.

A graft copolymer of pMMA with polythiophene may have advantages over the comparable block copolymer. While not being bound to any given theory, in a block copolymer, polythiophene chains are joined on either end by the copolymer in a terpolymer, or on one end only in a diblock copolymer. Thus freedom of motion, and concomitant ability to self assemble is reduced (though not eliminated). With a graft copolymer polythiophene chains are joined on one end only. Freedom of motion is greater and the ability to self assemble is not as reduced. It is also possible that a diblock could also show a less hindered motion. This should result in polythiophene properties that are better, than those observed in triblock copolymers.

Applications for Polythiophene Polymers and Polythiophene Copolymers with Acrylic Polymers (i.e., pMMA)

Polythiophene polymers and copolymers with pMMA or polyamide could be useful in many applications. Examples of applications for these polymers and copolymers include, but are not limited to, those listed below. For each application, some of the advantages provided by the polymer/copolymer are described briefly.

Note that "polythiophene" includes any doped or substituted derivative of polythiophene polymer that has utility.

Organic light emitting diodes are one application for polythiophene. A PAT-pMMA copolymer would exhibit enhanced processability, and optical clarity. Moreover, use of pMMA enables performance and processing to be separated—the polythiophene can be designed for performance, and the pMMA phase will enable processing.

Polythiophene is useful in touch panel displays. Again, it is expected that a PAT-pMMA copolymer would have enhanced processing, and optical clarity. Plus, use of pMMA enables performance and processing to be separated—the polythiophene can be designed for performance knowing that the pMMA phase will enable processing.

Electrostatic charge dissipation coatings have been made with polythiophene. A PAT-pMMA copolymer of the invention would be expected to have enhanced processing, optical clarity, compatibility, and mechanical durability.

Electromagnetic interference shielding coatings containing the copolymer of the invention would have enhanced processing, optical clarity, compatibility, and mechanical durability.

Another use would be as an electrical discharge layer underneath a substrate exposed to electron beam imaging, such as in e-beam lithography.

Another use for the PAT copolymers is as a conductive support piece for a substrate exposed to electron beam imaging (e.g., SEM). The PAT-pMMA has both an increased processability and increased mechanical integrity compared to PAT.

Since PAT and PAT copolymers of the invention do not accumulate dust due to static charge development, they are useful for acrylic display windows. PAT is melt processed with an acrylic polymer for use in this application. The enhanced processing, optical clarity and mechanical durability of PAT-pMMA copolymers make them excellent candidates for this application.

PAT and its copolymers are useful to impart electrical conductivity to PA-11 and PA-12 for electrostatic charge dissipation. PAT is melt mixed with the polyamides, and the self-assembling nature of the PAT should give performance at low concentration—reducing the cost without altering performance of polyamide. The PAT-pMMA copolymer can also be melt mixed with the polyamide with the self-assembling nature of the PAT block providing performance at low concentration. The acrylic block may improve miscibility. A block copolymer of a polyamide and polythiophene would appear especially well suited for this application.

In a similar manner the block copolymers of the invention may be used to impart electrical conductivity to PVDF for electrostatic charge dissipation and to provide conductivity. While polythiophene would likely not be miscible with PVDF, the copolymers could be melt mixed—the acrylic block enabling miscibility. The self-assembling nature of the PAT block gives performance at low concentration—reducing cost without altering performance of the host.

Another application of PAT and its block copolymers is in electrostatic painting—providing electrical conductivity such that an otherwise insulating article is conductive enough that paint system can connect to an earth ground. The PAT or block copolymer can be melt mixed with the host material, with the self-assembling nature providing performance at low concentration reducing cost without altering the performance of the host. The acrylic block should improve miscibility.

Other applications for copolymers of the invention include, but are not limited to:

1. Fluoropolymers: PVDF coatings may be made conductive, and through the application of an electrical current an increase in temperature can be effected (in essence a resistive heating process), or the PVDF coating could be used for anti-static properties. Polythiophene and methylmethacrylate block copolymers could provide these properties. Since the pMMA segments are compatible with PVDF, melt mixing may be suitable to give intimate mixing. Again, the self assembly feature is critical, rendering conductive properties at low concentrations.

2. pMMA and Other Acrylic Polymers: There are benefits to making acrylic polymers, such as pMMA, conductive to the level that static charge dissipation can be effected. A slightly conductive product will not collect dust easily, during use or fabrication. An example is instrument clusters in automobiles and display panels. These adsorb significant levels of dust because of the ease with which the pMMA resin charges. The problem is especially pronounced when materials are handled during fabrication. Approaches to this type of problem have been tried, but a key factor is the need to maintain the color and transparency, of pMMA. Obviously materials such as carbon black are not suitable. Because of the self-assembly properties of polythiophenes, development of conductivity should occur at low levels, helping to preserve the color and transparency of the pMMA host resin. A block copolymer of polythiopehene and pMMA would be especially well suited to this application.

3. Polyamides A large application for polyamide-11 and polyamide-12 is extruded tubes that convey fuels. Because of this said tubes need to be able to dissipate static charge, so that an inadvertent spark does not cause ignition. Presently, this is done by blending carbon compounds into said polyamide before extruding into tubes. However, with carbon black, the concentration needed is high—10-20% by weight. In the case of carbon nanotubes, the concentration is much lower, but cost is higher. Self-assembling polythiophenes are ideal for this application—providing good conductivity at low cost, since not much is needed, without compromising the other important properties of the polyamides.

4. Fibers/Filaments: As described below in Polymerization Method 2.3 Block Copolymers of Polyamide Polymers and PAT's, copolymers of polythiophene polymers and polyamides may be produced. The polyamide is either of the aminoacid type, or the diamine/diacid type. Of course, a combination of the two polyamide types is possible as well.

Polyamides are easily made into fibers—by solution or melt extrusion processes. Thin fibers can be fabricated into woven textiles. These textiles are the basis of clothing, common household fabrics, etc. These fibers also can be fabricated into carpets or non-woven fabrics. Fibers with a thicker diameter are called filaments. Filaments are used in applications requiring greater mechanical strength, e.g., rope, wire, fishing lines, etc.

Conductive copolymers of polythiophene and polyamides could be fabricated directly into fibers or filaments, and used in the above applications where electrical conductivity is needed. For example clothing or carpets that were even slightly conductive would prevent static charge development. This would be important in areas such as chemical plants, where static charge "shocks" can ignite fires.

Conductive copolymers of polythiophene and polyamides may be blended into fibers or filaments of host polyamides:
  solution mixing before preparing fiber/filament
  melt mixing before preparing fiber/filament
  mechanical co-spinning (such as done for cotton/polyester blends)

These blends may be used in the same applications as set forth above. Because they are conductive, they would likewise serve the same applications where conductivity is needed, again as set forth above.

Electrostatic Painting and Electroplating:

Electrostatic painting of substrates with either liquids or powders, is commercially very important. However, the substrate painted must be slightly conductive, so that charged particles can discharge to ground. Almost all molded resin articles (polyolefinic, etc.) would not meet the conductivity requirement, and therefore be unsuitable for electrostatic painting. However, with a small amount of polythiophene or polythiophene copolymer present, conductivity sufficient for discharging would be present. Again, the level of polythiophene would be such that would be no compromise of properties of the molded article.

The same applies to electroplating. For a variety of applications, metals are deposited onto substrates via a solution bath containing metal ions. The article to be coated is biased so that metal ions in solution deposit onto the substrate as metal atoms. This can be done only if the substrate is conductive. As mentioned previously most resin articles are not suited for this because they are not conductive. However, with a small amount of polythiophene or polythiophene copolymer present, to improve conductivity, they would be suited. As with electrostatic painting, the level of polythiophene would be such that the properties of the coated article are not effected.

Preparation of Block Copolymers of Regioregular 3-alkyl Substituted Polythiophene (PAT) and Polymethylmethacrylate (pMMA).

The synthesis of PATs with functional substitution is documented in U.S. Pat. No. 5,756,653 A, US20040024171 A1, U.S. Pat. No. 6,602,974 B1, U.S. Pat. No. 6,166,172 A. However, none of the described techniques in these patents will incorporate methacrylates into the block copolymer due to the intrinsic problem of hydrogen atom abstraction from the 2-methyl group of the methacrylate that results in chain termination. Applicant's patents, such as U.S. Pat. No. 6,255,448, U.S. Pat. No. 6,569,967, U.S. Pat. No. 6,657,043, and WO 2004014926 describe a class of polymerization control agents, such as N-tert-butyl-N-[1-diethylphosphono-(2,2-dimethylpropyl)]nitroxide (DEPN) radical or alkoxyamines of this radical, where one particularly effective class of nitroxide sources includes alkoxyamine compounds such as (2-[N-tert-butyl-N(1-diethoxyphosphono-2,2-dimethylpropyl)aminoxy]isobutyric acid (iBA-DEPN) (shown below), where the DEPN radical is linked to an isobutyric acid radical, enables the incorporation of polymethyl methacrylate (PMMA) into block copolymers using the aforementioned control radical polymerization (CRP) catalyst. The following procedures are methods that will enable the formation of methacrylate block copolymers with PATs.

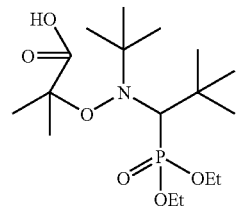 [SMILES: CCOP(=O)(OCC)C(N(OC(C)(C)C(=O)O)C(C)(C)C)C(C)(C)C]

Each esterification reaction listed below is described using dicylcohexylcarbodiimide and 4-dimethylaminopyridine, however, these reactions can be carried out using traditional esterification methods as will be evident to those skilled in the art. Reaction times and temperatures can be varied to reach the desired conversion (as measured by quantification of either hydroxyl—or acid groups remaining in the reaction medium).

Esterification Method 1.1 Capping PATs with Control Radical Polymerization Initiators:

Attachment of iBA-DEPN to hydroxyl terminated PATs can be made by traditional esterification routes including, but not limited to the following procedure. Charge 100 g (0.006 mol) of hydroxyl terminated PAT with a Mn=16,800, 2.2 g (0.006 mol) of iBA-DEPN and 0.73 g (0.006 mol) 4-dimethylaminopyridine are dissolved in an equal volume of dicholormethane under anhydrous and inert atmospheric condition in a reaction vessel equipped with mechanical stirrer, temperature probe, condenser and addition funnels. The agitator is turned on and the reaction vessel contents are cooled to 0° C. From the addition funnel, 3.3 g (0.016 mol) of dicylcohexylcarbodiimide in methylene chloride is added. The reaction is stirred for 0.5 hour at 0° C., and brought to room temperature and stirred another 3 hours. The capped polymer is precipitated by the addition of ethanol, and subsequently isolated on a Buchner funnel.

Esterification Method 1.2 Capping PATs with Control Radical Polymerization Initiators Stable at Higher Temperatures for Esterification.

Method 1.1 is an example of a lower temperature process for esterification with iBA-DEPN; however, other more conventional methodologies can be employed. iBA-DEPN can be further stabilized by a pre-reaction step to allow for higher temperature esterfication and polymerization procedures. For example, 400 g (1.05 mole) of iBA-DEPN and 128 g butyl acrylate (1.0 mol) can be diluted with methyl ethyl ketone (approx 60 wt % methyl ethyl ketone) in a vessel equipped with an agitator. The reaction mixture is heated to 78° C. for 4 hours under agitation, after which the solvent is removed to yield 528 grams of product. The reaction product can then be attached to the PATs under more aggressive reaction conditions without compromising the living character of the initiator. The esterification can be carried out up to temperatures of 105° C., but more preferably below 90° C. to prevent prepolymerization. The esterification protocols described in method 1.1 can be used directly or modified by employing higher reaction temperatures.

Esterification Method 1.3 Direct Esterification of Two Polymers.

A carboxylate terminated polymethacrylate polymer can be used with hydroxyl terminated PATs or alternatively hydroxyl terminated polymethacrylate can be used with a carboxylate terminated PAT to form ester linkages. Thus the key is to make the specific capped methacrylate that can be made by the following synthesis.

Charge 100 grams methylmethacrylate (1 mol), 0.762 grams (0.002 mol) iBA-DEPN into a reaction vessel equipped with mechanical stirrer, temperature probe, condenser and addition funnels. The polymer solution is sparged with nitrogen for 10 minutes. The reaction vessel is then heated to 70° C. under vigorous stirring. Temperature is maintained until desired conversion is reached (0.5-2 h's). The resultant polymer can be recovered by precipitation or the residual monomers and solvent can be directly removed under vacuum to yield a solid polymer. To help facilitate reaction control, 0.1 to 5 wt % styrene monomer can be added to the MMA feed. The corresponding esterification reaction can be carried out using the protocols outlined in methods 1.1 and 1.2 or the esterification can be carried out in the polymer melt using traditional esterification catalysts (blend polymers in a mechanical mixer at temperatures >180° C. for 10-60 minutes or until desired coupling is attained).

This direct esterification route can also be used to form a graft copolymer. For example, by starting with a polymer containing acid groups in the polymer backbone, such as a random copolymer of methylmethacrylate with (meth) acrylic acid, one could use the aforementioned esterification techniques to graft on a hydroxyl terminated PAT polymer.

Esterification Method 1.4 Generation of Graft Copolymers Via Transesterification.

Transesterification of polyacrylates, polymethacrylates and random and block copolymers of polyacrylates-co-methacrylates with hydroxyl terminated PATs can effectively yield graft copolymers.

Attachment of a hydroxyl teminated PAT to an acrylic or methacrylic containing polymer can be carried out using conventional transesterification methodologies as will be known to those skilled in the art. One method is to dissolve 100 g (0.006 mol) of hydroxyl terminated PAT with a Mn=16,800, 15 g (0.0015 mmol) of PMMA with an Mn=10,000, and 0.012 g tin ethylhexanoate (0.03 mmol) in an equal volume of toluene under anhydrous and inert atmospheric condition in a reaction vessel equipped with mechanical stirrer, temperature probe, condenser and addition funnels. The agitator is turned on and the reaction vessel contents are heated to reflux. The reaction is stirred for >1 hours at reflux (distilling off methanol). The capped polymer is precipitated by the addition of ethanol and subsequently isolated on a Buchner funnel. The corresponding reaction can be carried out in the absence of solvent (blend polymers and transesterification catalyst into a mechanical mixer and react at temperatures >180° C. for 10-60 minutes or until desired coupling is attained).

Esterification Method 1.5 Generation of Macromonomers via Esterification

Formation of a macromonomer can be carried out by attaching a vinyl group to hydroxyl teminated PATs. One such example is through the addition of an acrylic acid or methacrylic acid monomer by traditional esterification routes including, but not limited to the following procedure. Charge 100 g (0.006 mol) of hydroxyl terminated PAT with a Mn=16,800, 0.4 g (0.006 mol) of acrylic acid and 0.73 g (0.006 mol) 4-dimethylaminopyridine are dissolved in an equal volume of dicholormethane under anhydrous and inert atmospheric condition in a reaction vessel equipped with mechanical stirrer, temperature probe, condenser and addition funnels. The agitator is turned on and the reaction vessel contents are cooled to 0° C. From the addition funnel, 3.3 g (0.016 mol) of dicylcohexylcarbodiimide in methylene chloride is added. The reaction is stirred for 1 hour at 0° C. and brought to room temperature and stirred another 3 hours. The capped polymer is precipitated by the addition of ethanol and subsequently isolated on a Buchner funnel.

The macromonomer from above can be converted to a macroinitiator using similar protocols to method 1.2. For example, 2.14 g (0.0056 mole) of iBA-DEPN and 100 g macromonomer (0.0059 mol) can be diluted with butyl acetate (approx 60 wt % butyl acetate) in a vessel equipped with an agitator. The reaction mixture is heated to 80° C. for 4 hours under agitation, after which the solvent is removed to yield 102.14 grams of macroinitiator product.

Another approach to creating the macromonomer would be to react acryloyl chloride with the hydroxyl terminated PAT. Conditions for this reaction would be evident to one skilled in the art.

Esterification Method 1.6 Incorporation of Spacer Group into PAT Macromers

The PAT-containing macromonomer or the parent homopolymer bearing specific reactive functional groups can also be designed to include a spacer group between the acrylate functional group and PAT segment, as depicted below. This spacer group may affect how the PAT segment phase separates from the matrix. The spacer moiety may consist of any flexible chain segments, including methylene, ethylene oxide, or siloxane units. The spacer unit may be derived from either a reactive monomer unit, i.e. a macromonomer, or a suitably reactive difunctional spacer unit precursor. The chemical identity and length of the spacer group will influence how efficient the PAT segment is decoupled from the backbone and the $T_g$ of the PMMA matrix.

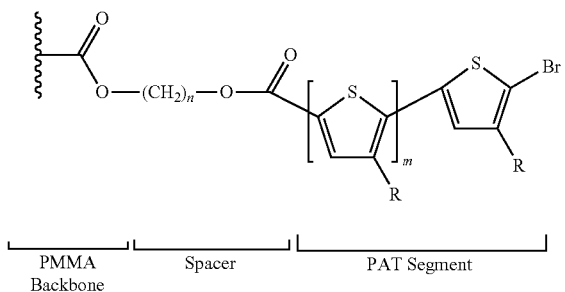

Macromer synthesis will greatly depend on the length and identity of the spacer group. One method to produce a spacer would be to use the synthetic method described above and replace acrylic acid with a higher molecular weight acrylate acid, such as 2-carboxyethyl acrylate or mono-2-(acryloyloxy)ethyl succinate. An acid-functionalized PAT could also be coupled with hydroxy-functionalized monomers, such as hydroxypropyl acrylate, hydroxybutyl acrylate, or poly(ethylene glycol) acrylate.

Esterification Method 1.7 for Block Copolymer Synthesis: Sequential Reaction of 1,2-Propanediol with Carboxylic Acid-Terminated PMMA and PAT, Respectively.

A. First Step: Preparation of Hydroxyl-Terminated PMMA-OH:

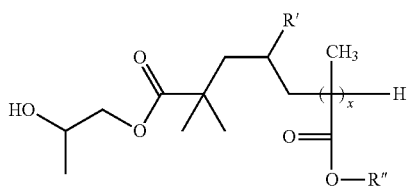

A 500 ml, 3-neck round bottom flask equipped with an overhead mechanical stirrer and adapter, a 125 mL addition funnel capped with a rubber septum, and a reflux condenser with a gas inlet was charged with 21.89 grams of carboxylic acid-end group PMMA-CO$_2$H ($M_n$=27,108; PDI=1.8) prepared using the butyl acrylate stabilized iBu-DEPN initiator (described in Method. 1.2 above). The reactor was sealed and purged with a rapid flow of N$_2$ gas for 15 minutes. The addition funnel was charged with 100 mL of reagent grade CH$_2$Cl$_2$, 5.0 mL of 1,2-propanediol (68.1 mmol, 76.10 g/mol), 2.0 mL of Et$_3$N (14.35 mmol, 101.19 g/mol), and 300 µL of catalytic pyridine (3.7 mmol, 79.10 g/mol), the contents of which were added all at once to the reactor and the polymer dissolved. The addition funnel was then charged with another 25 mL of CH$_2$Cl$_2$ and 2.0 mL of SOCl$_2$ (27.5 mmol). The reactor was then immersed in an ice bath and the temperature reduced to 5-10° C. at which time the SOCl$_2$ solution was added dropwise over 30 minutes. The reactor was then heated to 40-45° C. for 5 hrs. After cooling the reactor to room temperature, the organic solution was extracted with 2×50 mL of 5 wt % aqueous NaHCO$_3$, 1×50 mL of deionized H$_2$O, and 1×50 mL of brine solution. The organic phase was dried over anhydrous MgSO$_4$ for 2 hrs. after which time the insoluble materials were removed using a glass fritted funnel. The volume of the organic phase was then reduced by roughly 50% using a rotary evaporator and the modified polymer PMMA-OH material was then precipitated by dropwise addition into a ten-fold excess of rapidly stirring hexanes. The precipitated polymer was isolated on a glass-fritted funnel using vacuum filtration, rinsed with 25 mL of hexanes, and then dried under high vacuum overnight. The dried polymer (18.56 grams) was then characterized using $^1$H and $^{13}$C NMR (CDCl$_3$) and GPC.

NMR analyses showed peaks consistent with PMMA and those characteristic of the mono-esterified 1,2-propanediol unit at ($^1$H NMR; CDCl$_3$) δ=3.813 ppm (singlet, —OH), δ=2.460 ppm (broad singlet; —CH$_2$—) and ($^{13}$C NMR, CDCl$_3$) δ=68.190 ppm and 68.075 ppm (two singlets; —CH— and —CH$_2$—, respectively). End group analysis indicated roughly 1.0 mmol —OH end group per 10.1 grams of isolated PMMA-OH. GPC analysis in THF showed $M_n$=26,437 and a PDI of 1.7 (unimodal).

B. Second Step: Coupling of Hydroxyl-Terminated PMMA-OH with Thiophene Acyl Chloride:

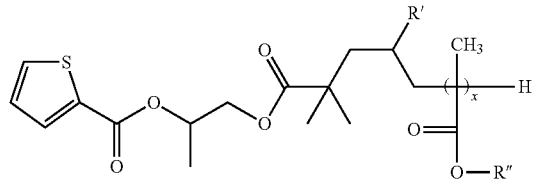

A 100 mL 3 neck round bottom flask equipped with a magnetic stir bar, a reflux condenser with an attached gas inlet, a 60 mL addition funnel with an attached rubber septum, and a thermometer and its adapter was charged with 2.5 grams of the PMMA-OH (0.25 mmol —OH end group) prepared in the First Step above. After flushing with a rapid N$_2$ flow for 20 minutes, the addition funnel was charged with 40 mL of CHCl$_3$, 20 mL of CH$_3$CN, and 2.0 mL of 2-thiophene acyl chloride (2.744 grams, 18.72 mmol). The acylating agent solution was then added all at once to the PMMA-OH at room temperature. A heating mantle was placed beneath the reactor and the solution was heated to 60-65° C. overnight. After cooling to room temperature, the organic solution was extracted with 2×25 mL of 5 wt % aqueous NaHCO$_3$, 1×25 mL of deionized H$_2$O, and 1×25 mL of brine solution. The organic phase was dried over anhydrous MgSO$_4$ for 2 hrs. after which time the insoluble materials were removed using a glass fritted funnel. The CHCl$_3$ was reduced to roughly 40 mL in volume using a rotary evaporator. The thiophene functionalized PMMA was then isolated by precipitating the polymer solution into 500 mL of hexanes. The off-white to light yellow polymer was isolated via vacuum filtration on a glass-fritted funnel. After rinsing with 25 mL of hexanes and initial drying, the polymer was placed in a tared flask and further dried accomplished under vacuum overnight. The dried polymer (2.17 grams) was then characterized by ¹H NMR, ¹³C NMR, and GPC.

NMR analyses showed peaks consistent with PMMA and those characteristic of the thiophene esterified product PMMA-O₂C(2-thiophene) (¹H NMR; CDCl₃) δ=7.951-7.939 ppm (doublet; aromatic 1H), δ=7.175-7.146 ppm (doublet, aromatic 1H), and δ=7.716-7.700 ppm (complex multiplet, aromatic 1H) and (¹³C NMR, CDCl₃) δ=156.567 ppm (carbonyl) and 135.964 ppm, 135.451 ppm, 132.104 ppm, and 128.475 ppm (aromatic). GPC analysis in THF showed $M_n$=27,601 and a PDI of 1.7 (unimodal).

B. Second Step: Coupling of Hydroxyl-Terminated PMMA-OH with Carboxylic Acid Terminated PAT:

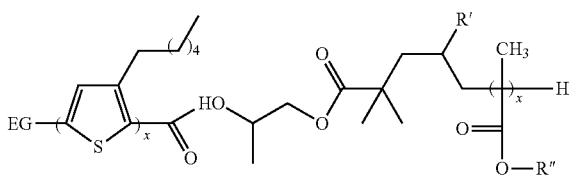

A 250 mL 3 neck flask equipped with a magnetic stir bar, a reflux condenser with an attached gas inlet, a 125 mL addition funnel with an attached rubber septum, and a thermometer and its adapter was charged with 3.2 grams of the PMMA-OH (0.317 mmol —OH end group) prepared in the First Step above and 1.25 grams of the PAT-CO₂H conducting polymer. After flushing with a rapid N₂ flow for 20 minutes, the addition funnel was charged with 100 mL of reagent grade CH₂Cl₂, 2.0 mL of Et₃N (14.35 mmol, 101.19 g/mol), and 300 μL of catalytic pyridine (3.7 mmol, 79.10 g/mol), the contents of which were added all at once to the reactor and the polymer dissolved. The addition funnel was then charged with another 25 mL of CH₂Cl₂ and 2.0 mL of SOCl₂ (27.5 mmol). The reactor was then immersed in an ice bath and the temperature reduced to 5-10° C. at which time the SOCl₂ solution was added dropwise over 30 minutes. The reactor was then heated to 40-45° C. for 30 minutes and then cooled to room temperature with stirring for 72 hrs. A heating mantle was placed beneath the reactor and the solution was heated to 60-65° C. for 3 hrs. After cooling to room temperature, the organic solution was diluted with an additional 50 mL of CHCl₃ and then extracted with 2×50 mL of 5 wt % aqueous NaHCO₃, 1×50 mL of deionized H₂O, and 1×50 mL of brine solution. The organic phase was dried over anhydrous MgSO₄ for 2 hrs. after which time the insoluble materials were removed using a glass fritted funnel. The CHCl₃ was reduced to roughly 40 mL in volume using a rotary evaporator. The thiophene functionalized PMMA was then isolated by precipitating the polymer solution into 500 mL of hexanes. The off-white to light yellow polymer was isolated via vacuum filtration on a glass-fritted funnel. After rinsing with 25 mL of hexanes and initial drying, the polymer was placed in a tared flask and further dried accomplished under vacuum overnight. The dried polymer (3.61 grams) was then characterized by ¹H NMR and GPC.

NMR analyses showed peaks consistent with PMMA and those characteristic of the thiophene esterified product PMMA-O₂C(6-hexylPAT) (¹H NMR; CDCl₃) δ=6.950 ppm (broad singlet; aromatic 1H), δ=2.772 ppm (broad singlet, —CH₂—). GPC analysis in THF showed $M_n$=29,996 and a PDI of 2.7 (unimodal).

Polymerization Method 2.0: Preparation of Poly(3-hexyl) thiophene from 2,5-dibromo-3-hexylthiophene:

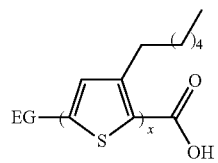

A 250 mL 3 neck flask equipped with an overhead mechanical stirrer and its adapter, a reflux condenser with an attached gas inlet, and a Claisen adapter with a rubber septum and a 60 mL addition funnel with a second rubber septum attached, and a thermometer and its adapter was charged with 5.0 grams of 2,5-dibromo-3-hexylthiophene (15.33 mmol). After flushing with a rapid N₂ flow for 20 minutes, the addition funnel was charged with 100 mL of anhydrous THF that was added directly to the dibromide. Then 5.0 mL of n-propyl magnesium chloride (2.0 M in Et₂O, 10 mmol) was added via syringe. A heating mantle was placed beneath the reactor that was then heated to 65° C. for 1 hr. In a separate round bottom flask was placed 20 mg of NiCl₂(TPP)₂ catalyst and 20 mL of anhydrous THF. The catalyst suspension was then transferred directly to the thiophene dibromide solution in THF via cannula through the rubber septum. Continued heating of the monomer-catalyst solution was done at 65° C. for 1 hr. at which time a second charge of NiCl₂(TPP)₂ in 20 mL of anhydrous THF was done as before with subsequent, continued heating of the polymer solution at 65-68° C. for an additional 1 hr. A needle was then immersed directly into the polymerization solution to deliver CO₂ gas for polymer chain end functionalization. Rapid bubbling of CO₂ gas continued for roughly 30 minutes during which time the polymer solution turned purple and subsequent formation of a dark solid suspension. The needle was then removed and the suspension stirred at room temperature overnight at room temperature. The volatiles were then removed using a rotary evaporator and the dark solid mass dissolved into 125 mL of CHCl₃ with gentle heating to 35° C. The organic solution was then extracted with 2×100 mL of 1M aq. HCl, 1×50 mL of deionized H₂O, 2×100 mL of 5 wt % aq. NaHCO₃ solution, and 1×50 mL of brine solution. The organic phase was dried over anhydrous MgSO₄ for 2 hrs. after which time the insoluble materials were removed using a glass fritted funnel. The volatiles were removed using a rotary evaporator to yield a dark purple solid possessing a characteristic metallic sheet. The dried polymer (2.68 grams) was then characterized by ¹H NMR, ¹³C NMR, and GPC.

NMR analyses showed peaks consistent with the regioregular poly(3-hexyl)thiophene structure (¹H NMR; CDCl₃) δ=6.961 ppm (broad singlet; aromatic, 1H), δ=3.025-2.705 ppm, (complex multiplet, 2H, —CH₂—), δ=1.756-1.602 ppm (complex multiplet, 2H, —CH₂—), and δ=1.503-1.217 ppm (complex multiplet, 4H, —CH₂—) δ=1.025-0.801 ppm (complex multiplet, 3H, —CH₃) and (13C NMR, CDCl₃) Carbonyl: 166.230 ppm; Aromatic: δ=140.170 ppm, 134.021 ppm, 130.791 ppm, 128.884 ppm; Alkyl: δ=31.946 ppm, 30.757 ppm, 29.728 ppm, 29.437 ppm, 22.887 ppm, 24.333 ppm. End group analysis indicated roughly 1.0 mmol —CO₂H end group per 5.1 grams of isolated carboxylic acid terminated poly[(3-hexyl)thiophene]. GPC analysis in THF showed $M_n$=10,371 and a PDI of 5.1.

Polymerization Method 2.1

The controlled polymers are synthesized using the following generic protocol. Target molecular weights are achieved by manipulating the monomer to initiator concentration, ([M]/[I]). Therefore a targeted molecular weight can be achieved by setting the [M]/[I] ratio, and then carrying out the polymerization to the desired conversion necessary to attain the target molecular weight. Monomer conversion will be monitored by gas chromatography (GC) analysis or flash devolatilization of the monomer under vacuum. The polymer examples will be run neat or in solution. Typical solvents used include, but are not exlusive to, toluene, ethyl benzene, methyl ethyl ketone, butyl acetate, and xylenes. Polymerizations can be carried out at ambient pressures or run under nitrogen pressure. Polymerizations are carried out in standard polymerization vessels with traditional mixing, heating, and cooling capabilities as will be known to those familiar to the art.

To attain a pure block copolymer, in a reactor system, charge 100 g (0.006 mol) of the alkoxyamine capped polymer from any of the described methods listed above and 100 g (1 mol) of methylmethacrylate (MMA). Dilute to 50 wt % in xylene and begin agitation. Heat the reaction vessel up to 100° C. and hold for 1-2 hours. The excess MMA along with solvent is stripped under vacuum to yield the solid polymer.

To attain a gradient block copolymer, in a reactor system, charge 100 g (0.006 mol) of the capped polymer from any of the described methods listed above and 90 g (0.9 mol) of methylmethacrylate (MMA) and 10 g (0.1 mol) of ethyl acrylate (EA). Dilute to 50 wt % in xylene and begin agitation. Heat the reaction vessel up to 100° C. and hold for 1-2 hours. The excess MMA, EA, along with solvent is stripped under vacuum to yield the solid polymer. EA can readily be replaced with other monomers, such as styrene as will be evident to those skilled in the art.

Polymerization Method 2.2 Graft Copolymers of MMA and Hydroxyl Terminated PATs.

In a reactor system, charge 100 g (0.006 mol) of the capped macromonomer from esterification method 1.5 listed above and 100 g (1 mol) of methylmethacrylate (MMA). Dilute to 50 wt % in xylene and begin agitation. Heat the reaction vessel up to 70° C. and add 5 g of AIBN over 30 minutes and hold for 2 hours. The excess MMA along with solvent is stripped under vacuum to yield the solid polymer.

Polymerization Method 2.3 Block Copolymers of Polyamide Polymers and PATs

An oligomer or polymer of polythiophene, with terminal hydroxyl groups, could be melt mixed (under vacuum to remove water, with small amount of protonic acid catalyst) with an amino acid, such as poly(11-aminoundecanoic acid), the monomer of PA-11. From this, polyamide polymer would grow from either end of the polythiophene, so the resultant polymer would have one segment of polythiophene near the center.

Another approach would employ diamine and diacid monomers, such 1,6-diaminohexane and adipic acid—the components of PA-6/6. Conditions similar to above would be employed. In this case the polythiophene oligomer/polymer with terminal hydroxyl groups would insert randomly in place of adipic acid. Because both free diacids and free dibases are used, the resultant chains would have alternating segments of polythiophene and polyamide, in contrast to the system using an amino acid.

Blends with PMMA and PA-11 and the Doping Thereof

Several different types of PAT materials were used in the present work. One set of PAT materials consisted of Plexcore HP (undoped, 3-hexyl substituted) and Plexcore MP (undoped, 3-alkoxy substituted). (Plextronics, Inc. Pittsburgh, Pa.). Another set consisted of PAT homopolymer and a PAT block copolymer with PMMA.

PAT materials were melt mixed with polyamide-11 (RILSAN Fine Powder Natural ES, Arkema) or PMMA co-polymer (91% MMA, 9% ethyl acrylate, Altuglas product VMH-FNA). Mixing was performed in the Atlas mixer in ASR. This tool accomplishes simple mixing by two parallel rotating plates at elevated temperature. Mixing was performed under nitrogen sparge at 220° C. Times were 2 minutes, 5 minutes and 12 minutes. Unless written otherwise, mixing time was 5 minutes. Amounts of PAT's were 1%, 5% and 15%. From said mixing, extruded articles were prepared—discs (with PA-11) and strands (with PMMA).

Doping was performed by exposing samples to vapors from iodine crystals at room temperature at atmospheric pressure. Conductivity was measured by simple two probe measurement.

Evaluation results are shown in the Tables 1 and 2.

All samples of HP and MP, in either PA-11 or PMMA, at 1% and 5% did not show any increase in electrical conductivity after ca. 2 weeks of doping. Samples in PA-11 showed weight increases up to ca. 18%, whereas PMMA samples showed weight increases of only ca. 0.1%. In the case of PA-11 samples, complexation of iodine with amine atoms results in the majority of the increase. Evidently, under the current mixing protocol, with PAT levels at or below 5%, good conductivity could not be achieved. It is possible that with longer times of exposure, and saturation of PA-11, that doping of PAT's might occur.

EDX analysis of selected samples of this group show inhomogeneity of sulfur concentration from middle to edge of sample. Two conclusions are drawn: (1) there appears to be no migration of PAT's outward during mixing, and (2) concentration of PAT's is not continuous. This latter point suggests that mixing may have been inadequate. This observation is consistent with that reported above, that no increase in conductivity is observed upon doping.

Follow-up experiments were done—melt mixing as described above, but using HP at concentrations of 15% in PA-11 and PMMA, and varying mixing times, 2 minutes, 5 minutes and 12 minutes.

It was found that 15% HP in PMMA increased to a conductivity of ca. $2.5 \times 10^{-3}$ ohm$^{-1}$cm$^{-1}$, and $7 \times 10^{-3}$ ohm$^{-1}$cm$^{-1}$ after 9 days iodine doping, with a weight increase of only ca. <1%. By contrast, 15% HP in PA-11 did not show any increase in conductivity, despite a weight increase of ca. 20%. Evidently, PA-11 competes more effectively for iodine than does PAT. As a reference, an extruded sample of plain HP showed a conductivity of $8 \times 10^{-2}$, with a 75% weight increase.

In the second set of materials examined (PAT homopolymer and PAT block copolymer, processed either as a pure compound or blended with PMMA; respectively), conductivity was only observed with the PAT homopolymer as a pure, melt processed material. The PAT homopolymer shows a 114% uptake of $I_2$ concomittant with the observed enhanced conductivity. Clear differences in $I_2$ uptake by the melt-processed block copolymer materials are observed as shown in Table 2. It is anticipated with further optimization of processing conditions, judicious dopant selection and exposure time, and manipulation of copolymer architechture that increased dopant uptake will impart conductivity.

EDX and optical analyses were also done on the materials shown in Table 2. The results showed discontinuous concentrations of PAT's across the sample although the PAT segment of the block copolymer exhibited a more uniform dispersion and domain size. This behavior is consistent with the self-assembly characteristics of the PAT unit, a requirement of imparting conductivity.

TABLE 1

| Sample | Final Weight Uptake - $I_2$ doping | Final Conductivity - $I_2$ doping | Concentration of PAT through cross-section of sample as determined by EDX |
|---|---|---|---|
| Plexcore HP (1%) in PMMA | 0.1 (1 week) | >20 M ohm (1 week) | — |
| Plexcore HP (1%) in PA-11 | 6.8 (1 week) | >20 M ohm (1 week) | — |
| Plexcore MP (1%) in PMMA | 0.1 (1 week) | >20 M ohm (1 week) | — |
| Plexcore MP (1%) in PA-11 | 5.7 (1 week) | >20 M ohm (1 week) | — |
| Plexcore HP (5%) in PMMA | 0.1 (1 week) | >20 M ohm (1 week) | discontinuous |
| Plexcore HP (5%) in PA-11 | 7.9 (1 week) | >20 M ohm (1 week) | discontinuous |
| Plexcore MP (5%) in PMMA | 0.1 (1 week) | >20 M ohm (1 week) | discontinuous |
| Plexcore MP (5%) in PA-11 | 11.1 (1 week) | >20 M ohm (1 week) | discontinuous |
| Plexcore HP (15%) in PMMA, 2 minute mix | 0.8 (9 days) | $7 \times 10^{-3}$ ohm$^{-1}$cm$^{-1}$ (9 days) | discontinuous (and optical) |
| Plexcore HP (15%) in PMMA, 5 minute mix | 0.4 (9 days) | >20 M ohm (9 days) | discontinuous (and optical) |
| Plexcore HP (15%) in PMMA, 12 minute mix | 0.5 (9 days) | $2.5 \times 10^{-3}$ ohm$^{-1}$cm$^{-1}$ (9 days) | discontinuous (and optical) |
| Plexcore HP (15%) in PA-11, 2 minute mix | 11.2 (9 days) | >20 M ohm (9 days) | — |
| Plexcore HP (15%) in PA-11, 5 minute mix | 14.8 (9 days) | >20 M ohm (9 days) | — |
| Plexcore HP (15%) in PA-11, 12 minute mix | 13.6 (9 days) | >20 M ohm (9 days) | — |
| Plexcore MP (15%) in PMMA, 2 minute mix | 0 (9 days) | >20 M ohm (9 days) | — |
| Plexcore MP (15%) in PMMA, 5 minute mix | 0.2 (9 days) | >20 M ohm (9 days) | — |
| Plexcore MP (15%) in PMMA, 12 minute mix | 0.5 (9 days) | >20 M ohm (9 days) | — |
| Plexcore MP (15%) in PA-11, 2 minute mix | 20.7 (9 days) | >20 M ohm (9 days) | — |
| Plexcore MP (15%) in PA-11, 5 minute mix | 19.6 (9 days) | >20 M ohm (9 days) | — |
| Plexcore HP (15%) in PA-11, 12 minute mix | 26.8 (9 days) | >20 M ohm (9 days) | — |

TABLE 2

| | Polymer Characteristics | | | Conductivity Determinations | | |
|---|---|---|---|---|---|---|
| Polymer Additive Composition | $M_n$ | PDI | Wt % S | Wt % Additive | % Uptake $I_2$ doping | Final Conductivity $I_2$ doping |
| PMMA-CO[OCH$_2$CH(CH$_3$)O]OC (thiophene) | 27,601 | 1.7 | 0.1% | 100 | 7.5 | >20 M ohm (1 week) |
| | | | | 15 | 5.2 | >20 M ohm (1 week) |
| | | | | 1 | 5.4 | >20 M ohm (1 week) |
| PMMA-CO[OCH$_2$CH(CH$_3$)O]OC[(3-Hexyl)PAT] | 29,996 | 2.7 | 5.2% | 100 | 10.6 | >20 M ohm (1 week) |
| | | | | 15 | 4.2 | >20 M ohm (1 week) |
| | | | | 1 | 4.4 | >20 M ohm (1 week) |
| Poly[(3-Hexyl)Thiophene]CO$_2$H | 10,371 | 5.1 | 19.1% | 100 | 114.3 | 3.5 ohm$^{-1}$cm$^{-1}$ |
| | | | | 15 | 4.0 | >20 M ohm (1 week) |
| | | | | 1 | 3.6 | >20 M ohm (1 week) |

TABLE 2-continued

| | Polymer Characteristics | | | Wt % | Conductivity Determinations | |
| --- | --- | --- | --- | --- | --- | --- |
| | | | | | % Uptake | Final Conductivity |
| Polymer Additive Composition | $M_n$ | PDI | Wt % S | Additive | $I_2$ doping | $I_2$ doping |

1. Molecular weights determined by GPC using universal calibration and PMMA standards.
2. Sample concentration was 2.0 mg/mL.
3. The flow rate was 1.0 mL/minute.
4. All melt processing was conducted using an Atlas small scale mixing unit at 220° C. under an $N_2$ atmosphere for 2 minutes.

What is claimed is:

1. An electroconductive copolymer composition comprising a block copolymer having repeating segments of A and B and optionally C, in which A is selected from substituted or unsubstituted polythiophene, B comprises a methacrylic polymer, copolymer or terpolymer comprising 60 to 100 weight percent methyl methacrylate units, and C is selected from ethylenically unsaturated copolymerizable monomers other than methylmethacrylate, and wherein said block copolymer contains alkoxyamine compounds which are end-capping moieties.

2. The electroconductive block copolymer of claim 1 having a regioregular structure of the A segments, which are electroconductive.

3. A method of manufacturing an electroconductive block copolymer as described in claim 1 comprising using controlled radical polymerization initiators and/or coupling of functionalized copolymers.

4. The method of claim 3 wherein the controlled radical polymerization initiator is an alkoxyamine.

5. An electroconductive polymer formulation comprising:
   a) from 0.01 to 70 percent by weight of said electroconductive block copolymer of claim 1; and
   b) from 99.99 to 30 percent by weight of one or more polymers miscible with said electroconductive copolymer.

6. An article formed from the electroconductive polymer formulation of claim 5.

7. The article of claim 6 comprising an organic light emitting diode, a touch panel display, an electrostatic charge dissipation coating, and electromagnetic interference shielding coating, and electrical discharge underlayer for use in electron beam imaging, a conductive support for a substrate exposed to electron beam imaging, an acrylic display window, an electrostatic dissipating PA-11 or PA-12, an electroconductive polyvinylidene fluoride, a substrate for receiving electrostatic painting or electroplating, or a fiber or filament.

8. An article comprising the electroconductive block copolymer composition of claim 1 comprising an organic light emitting diode, a touch panel display, an electrostatic charge dissipation coating, and electromagnetic interference shielding coating, and electrical discharge underlayer for use in electron beam imaging, a conductive support for a substrate exposed to electron beam imaging, an acrylic display window, an electrostatic dissipating PA-11 or PA-12, an electroconductive polyvinylidene fluoride, a substrate for receiving electrostatic painting or electroplating, or a fiber or filament.

* * * * *